United States Patent [19]
Yang et al.

[11] Patent Number: 5,153,644
[45] Date of Patent: Oct. 6, 1992

[54] DUAL MODE CORRECTION OF IMAGE DISTORTION IN A XEROGRAPHIC PRINTING APPARATUS

[75] Inventors: Eugene L. Yang, Fairport; James B. O'Leary, Rochester, both of N.Y.

[73] Assignee: Xerox Corporation, Stamford, Conn.

[21] Appl. No.: 747,301

[22] Filed: Aug. 19, 1991

[51] Int. Cl.⁵ .................... G03G 15/00; G03G 21/00
[52] U.S. Cl. ...................................... 355/236; 355/52
[58] Field of Search .................... 355/233, 236, 52

[56] References Cited

U.S. PATENT DOCUMENTS

| | | | |
|---|---|---|---|
| 4,226,527 | 10/1980 | Lama et al. | 355/233 X |
| 4,349,847 | 9/1982 | Traino | 358/293 |
| 4,414,583 | 11/1983 | Hooker | 358/300 |
| 4,427,275 | 1/1984 | Stalzer | 354/4 |
| 4,560,244 | 12/1985 | Ackerman | 350/486 |
| 4,561,023 | 12/1985 | Yip et al. | 358/208 |
| 4,595,295 | 6/1986 | Wilczynski | 356/401 |
| 4,600,837 | 7/1986 | DiStefano et al. | 250/235 |
| 4,661,699 | 4/1987 | Welmers et al. | 250/235 |
| 4,682,842 | 7/1987 | Breuggemann | 350/6.7 |
| 4,707,122 | 11/1987 | Lama et al. | 355/233 X |
| 4,801,978 | 1/1989 | Lama et al. | 355/69 |
| 4,837,636 | 6/1989 | Daniele et al. | 358/300 |
| 4,963,899 | 10/1990 | Resch, III | 346/157 |
| 4,975,626 | 12/1990 | Yagi et al. | 318/567 |

OTHER PUBLICATIONS

*Xerox Disclosure Journal*, vol. 15 No. 6, Nov./Dec. 1990, "Raster Output Scanner" Inventors: Joseph Iantuzzo and Thomas Robson pp. 455-461.

*Primary Examiner*—Fred L. Braun

[57] ABSTRACT

Correction of image distortion in a reproduction machine due to vibrational or speed distortions in or between a moving photoreceptor and an imaging device projecting raster lines on the photoreceptor as it moves past the imaging device, utilizing in encoder for sensing the speed of the photoreceptor and also the relative vibrational motion between the photoreceptor and the imaging device and providing electrical signals to a signal separator separating the electrical signals into lower and higher frequency signals, and a servo motor for driving the photoreceptor and compensating for the lower frequency increases or decreases in the speed of the photoreceptor, the servo motor being driven by the separated lower frequency signals; and an optical system for pivoting the projected raster lines to compensate for the image distortions which are of the higher frequencies, the optical system being driven by the higher frequency signals from the signal separator.

32 Claims, 3 Drawing Sheets

DUAL MODE CORRECTION OF IMAGE DISTORTION IN A XEROGRAPHIC PRINTING APPARATUS

Cross-reference and incorporation by reference is made to an allowed application by the same assignee, filed May 5, 1990, as U.S. application Ser. No. 07/524,895, by Joseph Fantuzzo, now entitled "Raster Scanner Including Scanning Beam Tilt Correction".

FIELD OF THE INVENTION

This invention relates to reproduction apparatus and methods such as in xerographic copiers/printers of the type which scan images onto a moving photoreceptor, and, more particularly, to a system for adjusting for or preventing distortion errors in images due to relative motion in the process direction between the photoreceptor and the image exposure device, including speed variations in the photoreceptor, in an improved and relatively low cost dual mode manner.

BACKGROUND OF THE INVENTION

Modern commercial reproduction systems such as printers incorporate exposure devices, such as raster output line scanning (ROS) laser beams or a linear transverse array of light emitting diodes, to sequentially, line by line, project images onto a moving photoreceptor. It is known that undesirable image exposure strobing and the like can result from mechanical vibrations of the components comprising the exposure device or the photoreceptor or from speed variations in the photoreceptor. The undesirable effects may include unscanned interstices between adjacent scan lines or overlapped scan lines. Strobing effects can occur when the major spectral content of the mechanical vibrations is in the 1 Hz to 500 Hz range. However, with typical photoreceptor process speeds of 100-400 mm/sec, frequencies less than 10 Hz do not normally produce visible strobing effects on the copies, due to the restricted sensitivity of the human eye thereto. Thus, the range of mechanical vibrations producing undesirable strobing effects is effectively between 10 Hz and 500 Hz. Of course, lower frequency photoreceptor speed fluctuations produce other image distortions.

Such strobing effects have been a long-standing problem in xerographic laser printers. Similar distortion or misregistration problems also occur in color xerography where color images must be precisely aligned or positioned on top of each other. Many ideas have been proposed to compensate for the distortions caused by the mechanical vibrations of the photoreceptor and the exposure device, or for variations in the speed of the photoreceptor.

For example, it is known to servo-control the speed of the photoreceptor. For example, U.S. Pat. Nos. 4,963,899 discloses a servo-controlled drive to control the speed and position of the photoreceptor so that image frames are properly registered on the photoreceptor. U.S. Pat. No. 4,837,636 discloses a motion sensor for sensing the relative position and velocity of the photoreceptor. Regarding other servo control systems, see, e.g., U.S. Pat. No. 4,332,461 which discloses a servo motor control for driving document scanning carriages in a continuously variable reduction copier.

Other ideas proposed to remedy strobing effects include controlling the exposure device. U.S. Pat. No. 4,427,275 discloses a system for non-impact printers such as those using LED's to eliminate discontinuity created because of the movement of the imaging surface relative to the LED display, through the adjustment of the enabling sequence of the LED's. U.S. Pat. No. 4,801,978 discloses an electronic printer which utilizes an encoder positioned on the photoreceptor to determine velocity and vibrational changes in the photoreceptor and to create an electrical signal to control the on-off time and intensity of the LED's to compensate for those changes.

In ROS type machines it has been proposed to control the speed of the polygonal scanning motor or the speed of the photoreceptor. U.S. Pat. No. 4,349,847 discloses a ROS having a laser beam and a rotating polygon scanning the beam across a charged photoconductive belt. The belt has timing marks which are detected by a light source and photosensor. The output from the photosensor corresponds to the belt velocity and this signal is used to control the angular velocity of the polygon. U.S. Pat. No. 4,975,626 also discloses a circuit for controlling the speed of the polygon motor.

Still other ideas proposed include controlling the tilt or angle of the beam scanning the images on the photoreceptor. U.S. Pat. No. 4,682,842 discloses a polygon scanner system for correcting wobble by double reflection of a light beam from a pair of fixed mirrors. U.S. Pat. No. 4,560,244 discloses a wobble-plate apparatus for redirecting an incident beam on target. U.S. Pat. No. 4,595,295 discloses a dual wobble-plate apparatus for refracting light in both the X and Y directions. U.S. Pat. Nos. 4,600,837 and 4,661,699 disclose systems for controlling the incident scanning beam path. U.S. Pat. No. 4,561,023 discloses a micro-deflector which deflects light impinging thereagainst, on the application of a bending potential, and which includes a dampening system to speed up restoration of the deflector to an undeflected quiescent position following removal of the bending potential.

A suggestion has been made for limiting strobing effects by controlling the tilt or angle of the laser beam scanning the images on the photoreceptor and the speed of the photoreceptor. Of particular interest is the above-cited allowed application Ser. No. 07/524,895, by Joseph Fantuzzo, now entitled "Raster Scanner Including Scanning Beam Tilt Correction" and to a corresponding article entitled, "Raster Output Scanner", published November/December 1990 in the *Xerox Disclosure Journal* (XDJ), Vol. 15, No. 6, pages 455–461, both of which disclose a ROS having a laser beam and a rotating polygon for scanning the beam across a charged photoreceptor, with "means for detecting the position of the beam relative to the imaging member (the photoreceptor) and generating a positive signal thereof, . . . [m]eans, responsive to the position signal, [for] control[ling] the velocity of the imaging member relative to the beam, . . . [m]eans responsive to the position signal, [for] adjust[ing] the tilt of the beam relative to the imaging member". [XDJ pg. 458, lines 30–35]. It is important to note that the means that said Fantuzzo discloses for detecting the position of the beam relative to the photoreceptor member is timing marks on the photoreceptor and sensors which detect speed variations and mechanical vibrations of the photoreceptor. Also, it is important to note in Fantuzzo that the position signal generated therefrom is used asynchronously, first to control the speed of the photoreceptor and then to control the tilt of the beam.

Prior suggested control arrangements such as these noted above are subject to various problems and shortcomings. For example, the above-mentioned proposed systems apparently do not compensate for relative vibrational motion between the belt module and the exposure device in the process direction. Such relative vibration could be induced by, for example, paper hitting a printer component, an operator closing a paper drawer, or a stitcher actuating or the like. The photoreceptor velocity encoder and control mechanisms discussed above only take account of speed and vibrational distortions in the photoreceptor per se.

Importantly, because of the high inertia of the moving photoreceptor elements, a servo or other similar speed control mechanism capable of responding to high frequency drive signals of over 300 Hz with the requisite very high accelerations and decelerations would be very expensive.

The disclosed apparatus may be readily operated and controlled in a conventional manner with conventional control systems. Some additional examples of various prior art copiers with control systems therefor are disclosed in U.S. Pat. Nos. 4,054,380; 4,062,061; 4,076,408; 4,078,787; 4,099,860; 4,125,325; 4,132,401; 4,144,550; 4,158,500; 4,176,945; 4,179,215; 4,299,101; 4,278,344; 4,284,270, and 4,475,156. It is well known in general and preferable to program and execute such control functions and logic with conventional software instructions for conventional microprocessors. This is taught by the above and other patents and various commercial copiers. Such software may of course vary depending on the particular function and the particular software system and the particular microprocessor or microcomputer system being utilized, but will be available to or readily programmable by those skilled in the applicable arts without undue experimentation from either verbal functional descriptions, such as those provided herein, and prior knowledge of those functions which are conventional, together with general knowledge in the software and computer arts. Controls may alternatively be provided utilizing various other known or suitable hard-wired logic or switching systems.

As shown in the above-cited art, the control of exemplary servo drivers and optical beam deflectors, and, for example, document and copy sheet feeding systems in copiers, may be accomplished by conventionally actuating them by signals from the copier controller directly or indirectly in response to simple programmed commands and from selected actuation or non-actuation of positional velocity, or vibrational sensors, etc.. The resultant controller signals may conventionally actuate various conventional electrically or mechanically-controlled sheet or optical beam deflectors, motors or clutches in the copier in the selected steps or sequences are programmed. Such microprocessor control circuitry and sensors may be utilized for determining the speed of the photoreceptor and mechanical vibrations of the photoreceptors, etc. and thereby controlling the operation of the photoreceptor servo motor, optical beam deflectors, etc., as further described herein.

All references cited above in this specification and their references, are incorporated by reference herein where appropriate for appropriate teachings of additional or alternative details, features, and/or technical background.

It is a feature or advantage of this invention to overcome various of the above-noted and other problems, and to provide a reproduction apparatus and method with reduced image quality distortions due to mechanical vibrations of the photoreceptor or the exposure device or variations in the speed of the photoreceptor, at reasonable cost. Unscanned interstices between adjacent scan lines or overlapped scan lines on the photoreceptor may thus be avoided.

An additional specific disclosed feature or advantage is to provide separation, into high and low frequency signals, of signals corresponding to mechanical vibrations of the photoreceptor or the exposure device or variations in the speed of the photoreceptor, for separate image distortion correction.

Another disclosed feature or advantage is to provide an optical system for compensating for high frequency distortions due to mechanical vibrations of or between the photoreceptor and the exposure device.

A further disclosed feature or advantage is to provide, in coordination, a low cost servo to drive the photoreceptor and to respond to low frequency distortions due to mechanical vibrations of the photoreceptor or the exposure device or variations in the speed of the photoreceptor.

A specific feature of the disclosed embodiment is correct image distortion in a reproduction machine due to vibrational and speed distortions in or between a moving photoconductive member and an electro-optical imaging device optically line scanning the photoconductive member as the photoconductive member moves past the imaging device, comprising the steps of: encoding, in electrical signals, the speed of the photoconductive member and also the relative vibrational motion between the photoconductive member and the imaging device; feeding said electrical signals to a signal separator; separating said electrical signals into lower frequency signals and higher frequency signals with said signal separator; feeding said lower frequency signals to a servo drive means to control the speed of the photoconductive member; and feeding said higher frequency signals to electrically controlled means (preferably, an electro-optical beam shifting transducer) for adjusting the position that said imaging device optically line scans.

The foregoing and other features and advantages of the present invention may be accomplished by the disclosed embodiment of an image distortion correction apparatus or method in a reproduction machine which corrects image distortion due to vibrational or speed distortions in or between a moving photoreceptor and an imaging device projecting scan lines on the photoreceptor as it moves past the imaging device. This exemplary image distortion correction apparatus preferably includes a ROS-mounted encoder for encoding the speed of the photoreceptor and also the relative vibrational motion between the photoreceptor and the imaging device, and for providing corresponding electrical signals therefrom, a signal separating for separating the electric signals into low frequency signals and high frequency signals, a servo motor to drive the photoreceptor and to compensate for any low frequency image distortions, and an optical pivoter to adjust the scan line projected onto the photoreceptor in order to compensate for any high frequency image distortions. The servo motor is driven by the low frequency signals and the optical pivoter is driven by the high frequency signals.

It should be noted that the subject image distortion correction apparatus is not limited to conventional xerographic printers and that it could easily be incorporated into a color printer or copier to more precisely register a second color latent image to or on top of a first color image previously put onto the photoreceptor.

BRIEF DESCRIPTION OF THE DRAWINGS

Various of the above-mentioned and further features and advantages will be apparent from the specific apparatus and its operation described in the example below, as well as from the claims. Thus, the present invention will be better understood from this description of an embodiment thereof, including the drawing figures wherein:

DETAILED DESCRIPTION OF A PREFERRED EMBODIMENT

Describing now in further detail the exemplary embodiment with reference to the Figures, there is shown a reproduction machine which, by way of example, is a well known type of xerographic printer 10. The xerographic printer 10 incorporates an image distortion correction apparatus in accordance with the present invention.

Figure 1:
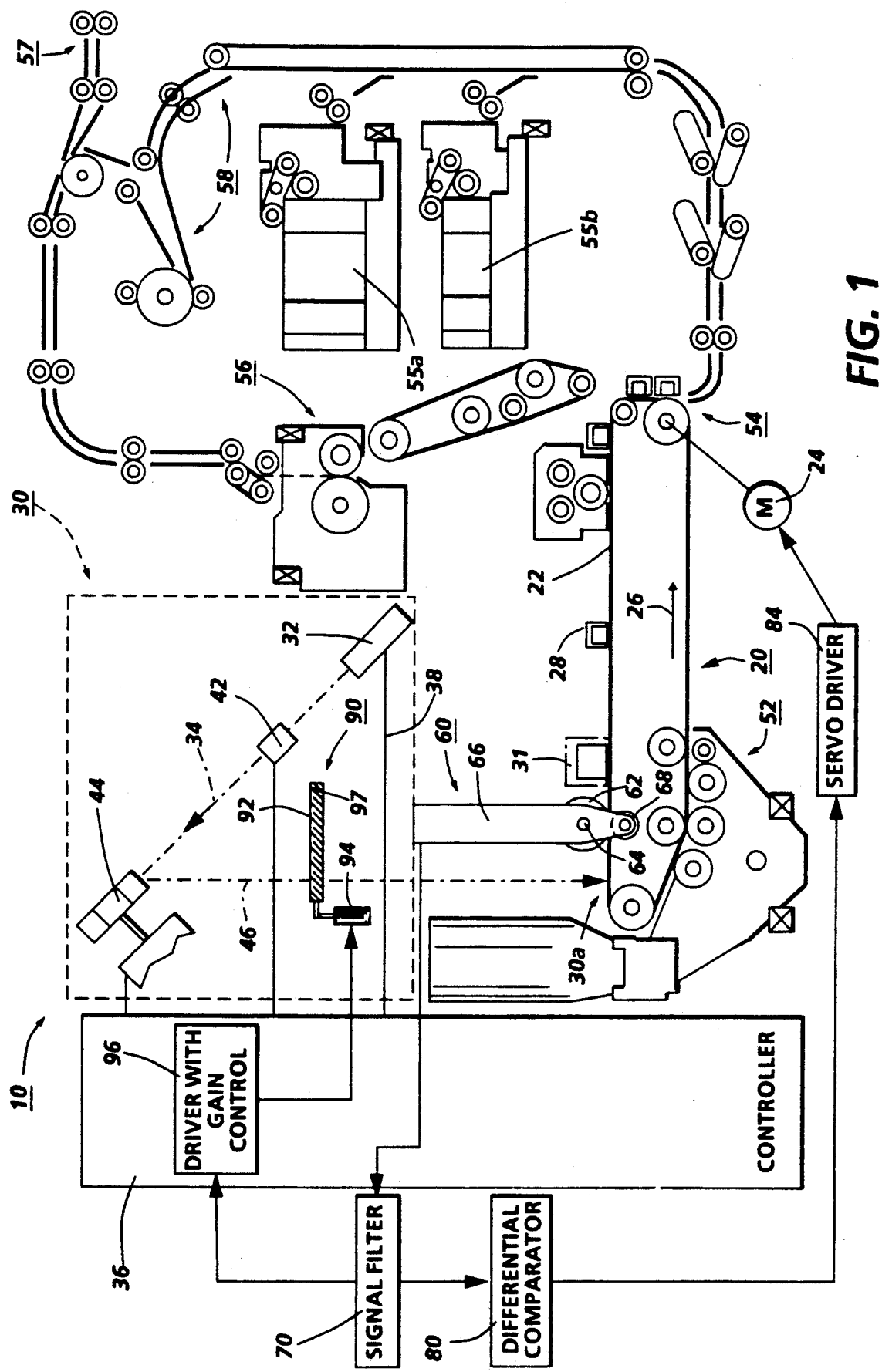
FIG. 1 is a schematic front view of an exemplary xerographic printer incorporating one embodiment of the subject image distortion correction system therein.

As shown in FIG. 1, the exemplary printer 10 includes a conventional xerographic system 20 in which the imaging member is a photoconductive belt 22 supported for rotation. [The present system may, of course, be used with various other well known imaging members such as a photoconductive drum wherein the imaging member is composed of selenium or other well known photoconductive materials.] A servo motor "M" 24 rotates the belt 22 in the direction shown by the solid line arrow 26 upon actuation of the printer. A corona charging device such as corotron 28 is in operative relationship with belt for placing a substantially uniform electrostatic charge on the belt preparatory to exposure thereof.

The photoconductive belt 22 is exposed by an exposure device 30 downstream of corotron 28 at an exposure station 30a. A raster output scanner (ROS) is used to sweep scan-expose the belt there to create a latent electrostatic image thereon with the exposure device 30. [The present system may be used in other types of imaging systems employing, for example, a pivoting or shiftable LED write bar 31 or projection LCD (liquid crystal display) or other electro-optic display as the "write" source.] Such ROS's are well known in the art. Here the ROS includes a laser 32 for generating a collimated beam of monochromatic radiation 34, an electronic subsystem (ESS), located in the machine electronic printing controller 36 that transmits a set of signals via 38 corresponding to a series of pixels to the laser and/or modulator, a modulator and beam shaping optics unit 42, which modulates the beam in accordance with the image information received from the ESS, and a rotatable polygon 44 having mirror facets for sweep deflecting the beam 34 into raster scan lines 46 which sequentially expose the surface of the belt 22 at exposure station 30a.

Following exposure, the latent electostatic image on the belt 22 is developed with toner at development station 52. After development of the latent electrostatic image, the toner image is transferred at transfer station 54 to a suitable copy substrate material, typically a sheet of copy paper, brought forward from trays 55a or 55b in timed relation to arrival of the toner image. The copy sheet bearing the toner image is then carried to a suitable fusing device 56 where the toner image is permanently adhered to the copy sheet. The copy sheet is then outputted at 57 (or inverted and returned for a second side (duplex) image via path 58) and then normally fed from output 57 to an associated finisher and/or collator (not shown).

Figure 2:
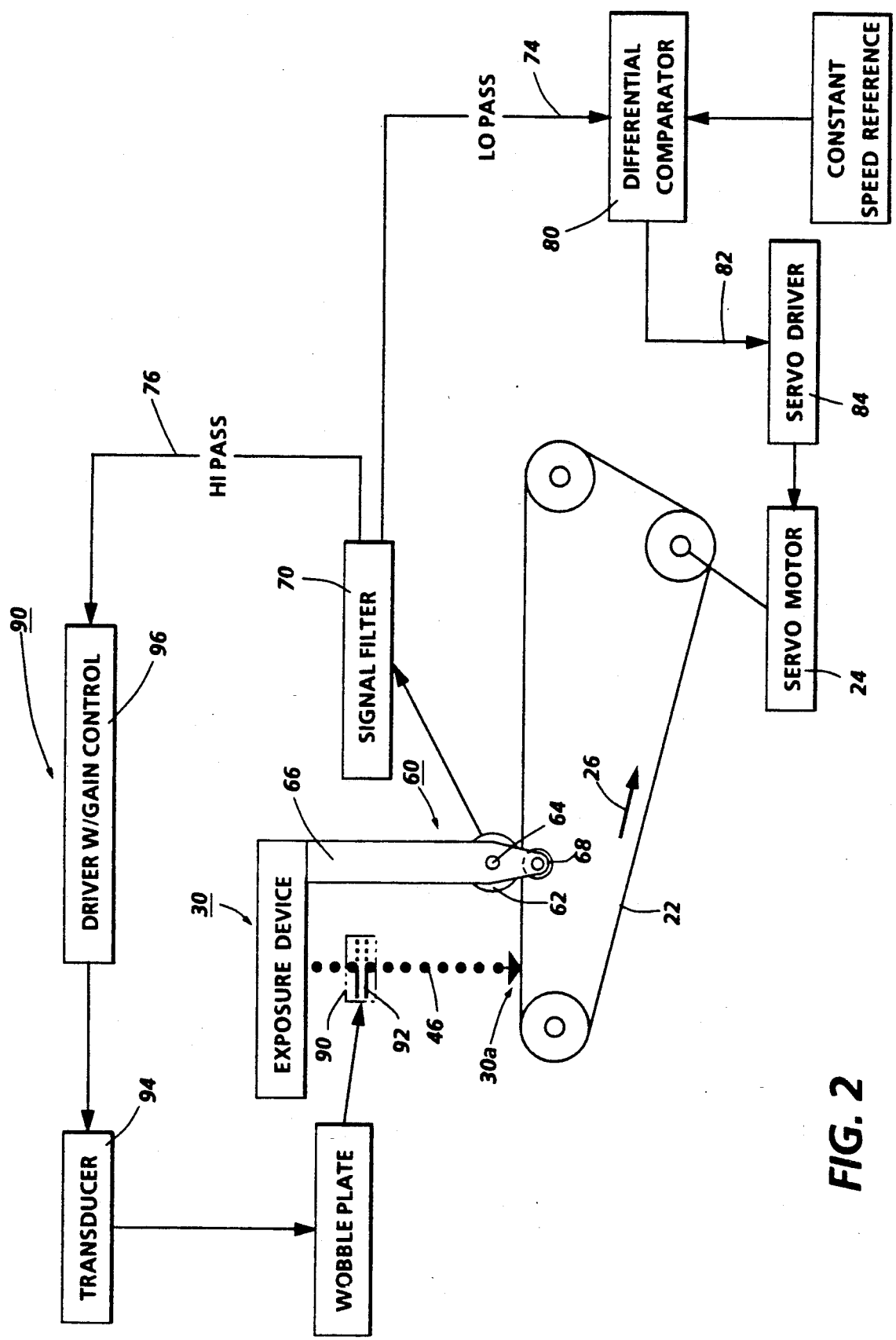
FIG. 2 is an enlarged schematic view of the subject image distortion correction system of FIG. 1.

Referring now to FIG. 2 as well as FIG. 1, an encoder device 60 is used here to measure the speed of the photoconductive belt 22 and also the relative mechanical vibrations between the belt 22 and the exposure device 30 in the process direction. Ideally, the encoder 60 is positioned at one edge of the belt 22 directly in the lateral plane of the scan line 46, i.e., at one end of the exposure station 30a. However, here the encoder 60 is alternatively shown in the Figures adjacent to but slightly downstream of the exposure station 30a, which provides better illustration clarity. The encoder 60 here includes an encoder contact wheel 62, an encoder shaft 64, an encoder housing 66, and a backing roller 68. The encoder contact wheel is a mechanical wheel tracking the belt surface motion and lateral vibrations relative to the imaging device. The underside of the photoreceptor belt under the encoder wheel is preferably supported by the backing roller, and preferably both are mounted to the encoder housing, which in turn is mounted to the ROS unit. Conventionally, on the encoder wheel are precision spaced black lines on a white background, which are sensed optically. Both the black-to-white and the white-to-black transitions can be counted. The encoder 60 sends speed and vibrational distortion signals into a signal filter 70 here.

Here, one end of the encoder shaft 64 is fixedly attached to the encoder contact wheel 62. The other end of the encoder shaft is attached to the encoder housing wheel 66. The encoder housing 66 is hard-mounted to the exposure device 30, the ROS unit. The encoder housing permits the encoder shaft 64 to reciprocate-laterally with the exposure device 30, and thus to detect relative sagittal (orthogonal to direction of scan) vibrational motion between the belt 22 and the exposure device 30. If either the belt or exposure device is vibrationally disturrbed, the encoder will register an electrical signal in proportion to the disturbance. Mechanical vibration of either the photoreceptor or the exposure device could be caused by paper hitting the fuser, the operator closing the paper drawer, stapler actuation, etc. These mechanical vibrations may be electrically encoded by the controller 36 in a spectrum of frequencies ranging from approximately 1 Hz to 500 Hz. Any relative up/down vibrational motions between the photoreceptor and the imaging device need not be encoded, since they are in line with the imaging beam, and not in the process direction. Such up/down vibrations would be expected to fall within the depth of focus of the scanning beam and not result in any visible image distortion.

It should also be noted that various other velocity/vibration sensor embodiments could be used in place of this exemplary encoder 60.

The spectrum of electrical signals from the encoder 60 due to both the mechanical vibrations in and between the belt 22 and the exposure device 30 and variations in the speed of the photoreceptor are fed into the electrical signal filter 70, which may be located in the controller 36. The signal filter 70 separates the encoded signals into DC/low frequency signals 74 which are preferably below about 10 to 15 Hz and into high frequency signals 76 which are preferably above about 10 to 15 Hz. Although the separating frequency or filter point can be varied, it has been chosen because of the high cost associated with manufacturing a photoreceptor servo drive motor capable of controlling frequency perturbations above 10 Hz. The high inertia of the moving photoreceptor and its drive motion makes it difficult to accelerate and decelerate the photoreceptor over the extremely short time periods associated with frequencies above 10 Hz. Such signal filters 70 are well known in the art and may include a low pass filter and a high pass filter. However, there is typically no need for the low pass filter since the servo motor is self-limiting in its high frequency response.

The DC/low frequency signals 74 are used to regulate the velocity of the belt 22. Referring to FIG. 2, these low frequency signals may be fed into a differential comparator 80 which compares the measured velocity to a perfect frequency from a built-in generator and measures the photoreceptor belt motion error (from the ideal) as an analog difference error signal 82. The error signal 82 is then used to control the servo driver 84 which powers the servo motor 24. In this way the speed of the photoreceptor 22 is regulated to account for low frequency mechanical vibrations in or between the belt and the exposure device and/or variations in the speed of the belt. Since low frequency signals have a longer time period, a less expensive servo motor 24 can be used as noted.

Figure 3:
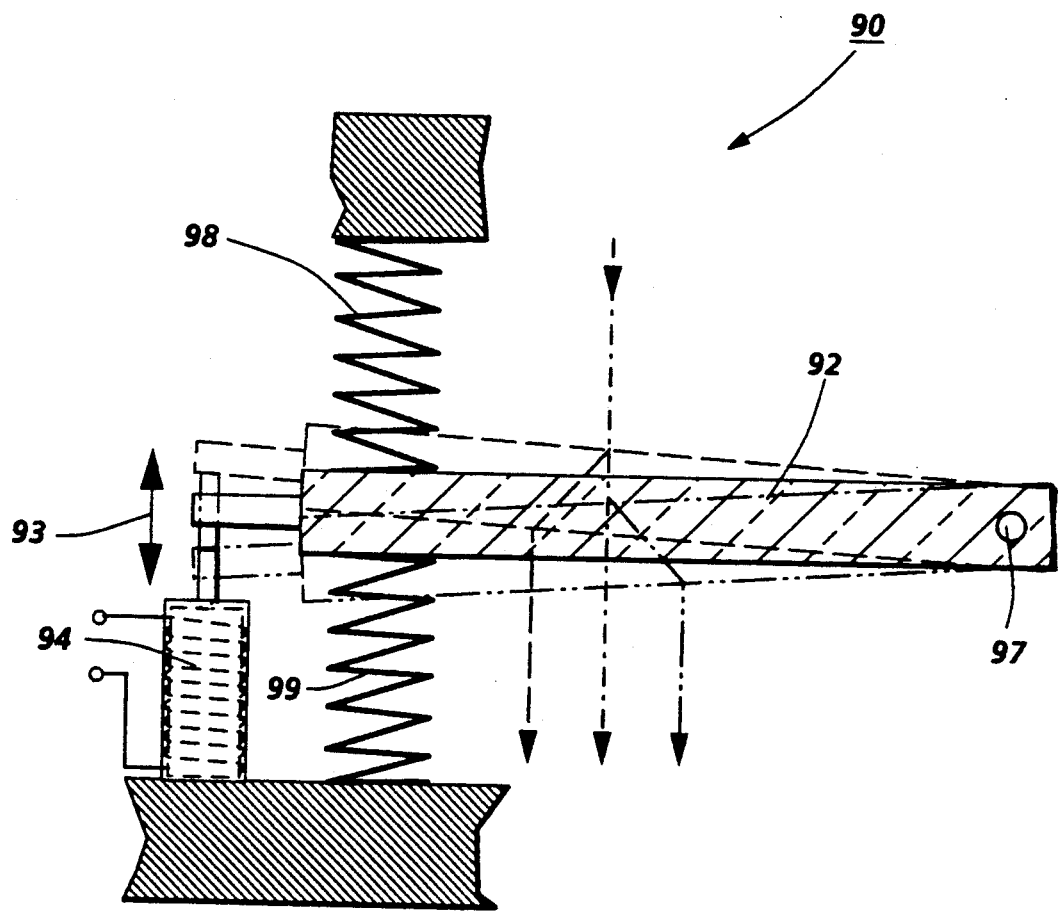
FIG. 3 is an enlarged schematic view of the exemplary wobble-plate system in FIG. 2.

While the servo motor corrects for gross distortion errors it also simultaneously eliminates what would otherwise be DC drift in the optical correction system. In other words, utilizing the servo motor to correct for low frequency distortions also "zeros" the optical correction system. This zeroing may be done within an inter-document-image space here. Constantly zeroing the optical correction system to its neutral or centered position allows it to be operated more linearly and predictably. Another benefit of using a servo motor correction in parallel is that it also permits anamorphic image magnification or reduction in the sagital direction, if desired. Referring to FIGS. 2 and 3, the separated high frequency signals 76 are simultaneously fed to an optical wobble-plate system 90. The wobble-plate system may be of various known or other types, of which one example is the above cited U.S. Pat. No. 4,595,295. The optical wobble-plate system 90 includes a low inertia wobble-plate 92 for deflecting the raster lines 46 sagittally (orthogonal to the direction of scan) along the surface of the belt 22, a damped tranducer 94 for adjusting the wobble-plate, and a driver with gain control 96 for driving the transducer 94. In the preferred embodiment, the optical wobble-plate is spring-loaded such that it is constrained to about one degree of motion and is driven by the damped transducer 94 which is fed open loop by the high frequency driver with gain control 96. The driver 96 enables the high frequency negative feedback to run open-loop with effective error cancellation. Thus, the driver only needs to correct only primary errors and not secondary (correction system) errors, as there is no image placement feedback from the photoreceptor required here. The driver gain control can be adjusted in an initial set-up procedure of the wobble-plate system in which a known vibration is induced in the system and the output correction accuracy is observed with copy test sheets.

Damped transducer 94 preferably has an internal critical damping period in the order of 1 ms to 2 ms. The damped transducer 94 can drive the low inertia wobble-plate 92 at up to 500 Hz., minimum, and can bring wobble-plate oscillation to rest well within the typical printer interprint time between images on the photoreceptor 22 of 100 ms to 500 ms.

Optical wobble plate 92 here is pivotally constrained at one end by a constraining member 97 and pivotable at the other end by the damped transducer 94. The wobble plate is positioned between the exposure device 30 and the exposure station 30a on the belt 22 so that the swept beam forming raster lines 46 must pass through the wobble-plate systems transparent glass plate 92. The wobble-plate can be located either external or internal to exposure device 30. The motion of the optical wobble plate here is restricted to about one degree of freedom in the direction of two-headed arrow 93. The signal driving the transducer 94 varies the angle of the wobble-plate 92 in relation to the light beam 46 to control or adjust the sagittal location of the raster line 46, belt 22 as the latent image is formed on the belt and to thereby provide image distortion correction. The beam is deflected by a defraction proportional to the angle of the plate 92 to the beam. This open loop drive is capable of correcting for vibrations up to 500 Hz and is substantially cheaper than servo motors capable of responding to such high frequency distortions. Other electro-optical devices, such as optical recording galvanometer or a light organ similar to those used in a Laser Light Show can be used instead of the wobble-plate system to deflect the raster lines.

Here restoring springs 98 and 99 are each shown in FIG. 3 attached at one end to wobble-plate 92 and at the other end to the fixed housing. Restoring springs 98 and 99 ensure that the optical wobble-plate 92 returns to neutral position (zero net DC shift) when drive power is momentarily turned off. That is desirably done coincident with unimaged interprint areas on the photoreceptor. It should be noted that other resilient members could be used to restore the wobble-plate to its neutral position. For example, the restoring springs could be pneumatically actuated or the wobble-plate could be partially mounted in a resilient rubber.

In operation, photoconductive belt 22 is driven by servo motor 24 in the direction of arrow 26. As the belt 22, preferably advances exposure device 30 scans image lines sagittally onto the surface of the belt at a constant rate. Laser beam 34 is deflected by polygon 44 through wobble-plate 92 to do so. When there are no mechanical vibrations or speed variations the wobble-plate 92 is in the neutral position. A speed variation in the belt or a mechanical vibration in or between the belt and the exposure device in the process direction will cause the belt to be out of synchronization with the exposure device and will result in either an undesirable unscanned gap in the sagittal direction along the belt or an undesirable overlap of scan lines in the sagittal direction along the belt. Encoder 50 is continually registering the speed of the belt and relative mechanical vibrations between the belt and the exposure device and feeding such signals to controller 36. In the controller 36 the signal filter 70 separates the encoder signals above and below about 10 to 15 Hz. Lower frequency signals 74 from encoder 60 are fed into differential comparator 80 which compares the measured velocity to the desired reference velocity and produces error signals 82. The error signals are used to control servo driver 84 which in turn controls servo motor 24. The servo motor 24 thereby adjusts the speed of the belt to minimize the low frequency image distortions. For example, if the low frequency signals indicated a possible unscanned sweep gap on the belt then the servo motor would slow down to compensate for the gap, while if the low frequency signals indicated possible overlapped lines then the servo motor would automatically speed up to compensate for the overlap. Meanwhile, the high frequency signals 76 from encoder 60 are fed to driver 96 which in turn drives damped transducer 94. As the damped transducer drives in one of the directions of arrow 93 wobble-plate 92 is pivoted accordingly and thereby likewise deflects very slightly, but rapidly, the scan line sagittally in that direction on the belt. The wobble-plate thereby adjusts the angle at which the scan line exposes the belt 22 at exposure station 30a to correct for high frequency image distortions.

While the embodiment disclosed herein is preferred, it will be appreciated from this teaching that various alternatives, modifications, variations or improvements therein may be made by those skilled in the art, which are intended to be encompassed by the following claims.

What is claimed is:

1. An image distortion correction apparatus in a reproduction machine for correcting image distortion due to vibrational or speed distortions in or between a moving photoconductive member and an optical imaging device projecting optical scan lines on the photoconductive member as the photoconductive member moves relative to the imaging device, comprising:
    encoder means for sensing the speed of the photoconductive member and also for sensing the relative vibrational motion between the photoconductive member and the imaging device and for providing corresponding electrical signals therefrom;
    signal separating means for separating said electrical signals into lower frequency signals and higher frequency signals;
    servo driver means for driving the photoconductive member and for compensating for any of said image distortions which are of said lower frequency, said servo driver means being driven by said lower frequency signals; and
    optical pivoting means for slightly pivoting said scan lines projected onto the photconductive member to compensate for said image distortions which are of said higher frequency, said optical pivoting means being driven by said higher frequency signals.

2. The image distortion correction apparatus of claim 1, wherein said servo driver means and said optical pivoting means are driven simultaneously by said lower frequency signals and said higher frequency signals, respectively.

3. The image distortion correction apparatus of claim 1, wherein said imaging device is a raster output scanning laser beam system which creates images by laying down repetitive raster patterns in the sagittal direction on the surface of the photoconductive member, and wherein said image distortion correction apparatus prevents unintentional unscanned or overlapped interstices between adjacent scan lines on the photoconductive member.

4. The image distortion correction apparatus of claim 1, wherein said imaging device is an array of light emitting diodes which recreates images by laying down repetitive patterns in the sagittal direction on the surface of the photoconductive member, and wherein said image distortion correction apparatus prevents unintentional unscanned or overlapped interstices between adjacent scan lines on the photoconductive member.

5. The image distortion correction apparatus of claim 1, wherein said electrical signals from said encoder means are between approximately 1 Hz and 500 Hz.

6. The image distortion correction apparatus of claim 1, wherein said signal separating means separates signals above and below approximately about 10 to 15 Hz.

7. The image distortion correction apparatus of claim 3, wherein said signal separating means separates signals above and below approximately about 10 to 15 Hz.

8. The image distortion correction apparatus of claim 4, wherein said signal separating means separates signals above and below approximately about 10 to 15 Hz.

9. The image distortion correction apparatus of claim 5, wherein said signal separating means separates signals above and below approximately about 10 to 15 Hz.

10. The image distortion correction apparatus of claim 1, wherein said signal separating means is a signal filter.

11. The image distortion correction apparatus of claim 1, wherein said optical pivoting means comprises a low inertia optical wobble-plate operatively positioned between the photoconductive member and the imaging device in the path of said scan lines, said wobble-plate being pivotable by an electrical transducer, said transducer being controlled by said higher frequency signals so that said wobble-plate is pivoted to adjust for said image distortions by pivoting the projected scan lines.

12. The image distortion correction apparatus of claim 11, wherein said transducer is driven by a driver with gain control in which the high frequency negative feedback can run open-loop with effective error cancellation.

13. The image distortion correction apparatus of claim 1, wherein said servo driver means comprises a servo motor driven by a servo driver, said servo driver being controlled by said lower frequency signals so that the speed of the moving photoconductive member is correspondingly increased or decreased to adjust for distortion in the sagittal location of the projected scan lines.

14. The image distortion correction apparatus of claim 11, wherein said optical pivoting means further includes resilient restoring means engaging said wobble-plate for restoring said wobble-plate to a neutral position when said higher frequency driving signals are removed, and means for removing said higher frequency signals from said pivoting means coincident with unimaged interprint areas on the photoconductive member.

15. The image distortion correction apparatus of claim 11, wherein said transducer responds to said signal frequencies of at least 500 Hz so that said wobble-plate can be driven to at least 500 Hz by said transducer.

16. The image distortion correction apparatus of claim 11, wherein said transducer is damped, with a damping period of between 1 ms and 2 ms.

17. The image distortion correction apparatus of claim 1, wherein said pivoting means is internal the imaging device.

18. The image distortion correction apparatus of claim 1, wherein said pivoting means is external the imaging device.

19. The image distortion correction apparatus of claim 1, wherein said encoder means includes an encoder shaft attached to a rotatable encoder wheel driven by the photoconductive member, said encoder shaft being attached to an encoder housing, and said encoder housing being hardmounted to the imaging device so that said encoder means can detect relative vibrations between the photoconductive member and the imaging device.

20. The image distortion correction apparatus of claim 6, wherein said encoder means includes an encoder shaft attached to a rotatable encoder wheel driven by the photoconductive member, said encoder shaft being attached to an encoder housing, and said encoder housing being hardmounted to the imaging device so that said encoder means can detect relative vibrations between the photoconductive member and the imaging device.

21. The image distortion correction apparatus of claim 11, wherein said encoder means includes an encoder shaft attached to a rotatable encoder wheel driven by the photoconductive member, said encoder shaft being attached to an encoder housing, and said encoder housing being hardmounted to the imaging device so that said encoder means can detect relative vibrations between the photoconductive member and the imaging device in the photoconductive member movement direction.

22. A printing machine of the type in which a raster output scanner produces an imaging beam which scans across a movable photoconductive member at selected positions to generate latent images on the movable photoconductive member, including:
    encoding means for electrically encoding mechanical vibrations in and between the photoconductive member and the raster output scanner, and the velocity of the photoconductive member;
    separating means for separating said encoded signals into low frequency signals and high frequency signals;
    first adjusting means, responsive to said low frequency signals, for adjusting the velocity of the moving photoconductive member relative to the beam position; and
    second adjusting means, responsive to said high frequency signals, for adjusting the position of the beam relative to the photoconductive member movement direction.

23. The printing machine of claim 22, wherein said encoding means includes an encoder wheel driven by the photoconductive member, an encoder housing attached to the raster output scanner, and an encoder shaft attached to said encoder wheel and said encoder housing, so that said encoder wheel electrically encodes both the speed of the photoconductive member and relative vibrations in or between the photoconductive member and the raster output scanner.

24. The printing machine of claim 22, wherein said first adjusting means includes a servo drive motor coupled to the photoconductive member, said servo drive motor being responsive to said low frequency signals from said encoding means for adjusting the velocity of the photoconductive member.

25. The printing machine of claim 22, wherein said second adjusting means includes a low inertia wobble-plate driven by a damped transducer, said transducer being driven by said high frequency signals from said encoding means for adjusting the angle of the imaging beam relative to the photoconductive member.

26. A method of correcting image distortion in a reproduction machine due to vibrational and speed distortions in or between a moving photoconductive member and an electro-optical imaging device optically line scanning the photoconductive member as the photoconductive member moves past the imaging device, comprising the steps of:
    encoding, in electrical signals, the speed of the photoconductive member and also the relative vibrational motion between the photoconductive member and the imaging device;
    feeding said electrical signals to a signal separator;
    separating said electrical signals into lower frequency signals and higher frequency signals with said signal separator;
    feeding said lower frequency signals to control the speed of the photoconductive member;
    feeding said higher frequency signals to electrically adjust the position that said imaging device optically line scans the photoconductive member.

27. The method of claim 26, wherein said higher frequency signals adjust the position that said imaging device optically line scans by pivoting the optical path, and said lower frequency signals and said higher frequency signals are simultaneously fed for said photoconductive member speed control and said optical path pivoting, respectively.

28. The method of claim 27, wherein said optical path pivoting comprises pivoting a wobble-plate driven by a damped transducer which is driven by said higher frequency signals to adjust the position of scan lines projected on the photoconductive member, simultaneously with said lower frequency signals control of the speed of the photoconductive member, so that unscanned interstices between adjacent scan lines or overlapped scan lines are reduced.

29. The method of claim 26, wherein said encoding of relative vibrations between the photoconductive member and the imaging device is provided by mechanically mounting a photoreceptor motion sensor to said imaging device.

30. The method of claim 26, wherein said encoding step further includes the steps of:
    using an encoder wheel driven by the photoconductive member to electrically encode the velocity of the photoconductive member; and
    using an encoder shaft attached to said encoder wheel and to the imaging device to electrically encode the relative vibrations in or between the photoconductive member and the imaging device.

31. The method of claim 26, wherein said encoded electrical signals are between approximately 1 Hz and 500 Hz.

32. The method of claim 26, wherein said electrical signals are so separated above and below approximately about 10 to 15 Hz.

* * * * *